United States Patent [19]

Wang

[11] 4,018,755
[45] Apr. 19, 1977

[54] EXTRACTION OF PROTEINS FROM VEGETABLE SEED COMPOSITIONS

[75] Inventor: Li Chuan Wang, Peoria, Ill.

[73] Assignee: The United States of America as represented by the Secretary of Agriculture, Washington, D.C.

[22] Filed: May 12, 1975

[21] Appl. No.: 576,758

[52] U.S. Cl. .......................................... 260/123.5
[51] Int. Cl.² .......................................... A23J 1/14
[58] Field of Search ..................... 260/123.5, 112 R

[56] References Cited

UNITED STATES PATENTS

| | | | |
|---|---|---|---|
| 3,649,293 | 3/1972 | Hoer | 260/123.5 |
| 3,662,672 | 5/1972 | Hoer | 260/123.5 |
| 3,682,646 | 8/1972 | Paolis | 260/123.5 |
| 3,816,389 | 6/1974 | Mihara | 260/123.5 |
| 3,869,438 | 3/1975 | Finley | 260/123.5 |

OTHER PUBLICATIONS

I. E. El Piner, "Ultrasound:Physical, Chemical and Biological Effects" Chapter VII, Consultants Bureau, New York, 1964.
D. Ensminger, "Ultrasonics, The Low- and High-Intensity Applications," Marcel Dekker Inc., New York 1973.

Primary Examiner—Paul R. Michl
Attorney, Agent, or Firm—M. Howard Silverstein; David G. McConnell; Curtis P. Ribando

[57] ABSTRACT

Vegetable seed flakes, meal, and the like prepared for extraction in the normal manner were treated with ultrasonic waves solubilizing the protein which was then recovered from solution. From about 50 to 100 percent of the total protein contained in toasted soy flakes was extracted in this manner.

11 Claims, No Drawings

EXTRACTION OF PROTEINS FROM VEGETABLE SEED COMPOSITIONS

BACKGROUND OF THE INVENTION

This invention relates to a method of extracting protein from vegetable seeds. With more and more vegetable protein going into human food, efficient extraction from vegetable seed flakes assumes more and more importance. Commercial extraction yields 30 percent or less of the weight of soybean flakes, and ideal laboratory extraction yields 42 percent of defatted flakes (A. K. Smith, In "Processed Plant Protein Foodstuffs," Ed. A. M. Altschul, Chapter 10, Academic Press, New York, 1958). For maximum yield of proteins, the flakes are unheated, but for maximum nutritive and flavor quality, the flakes require a moist heat treatment (i.e., toasting) (S. J. Circle and A. K. Smith, Ed., In "Soybeans: Chemistry and Technology," Chapter 9, Avi Publishing Company, Inc., Connecticut, 1972). Toasting causes protein denaturation which means low yields, diminished functionalities, and limited applications.

Up to now, extraction of vegetable proteins has been mostly done by conventional-stir (Circle and Smith, supra). Results from that method are good on untoasted flakes but poor on toasted flakes. High-speed stirring has been reported to grind the sample during extraction [T. M. Paulsen et al., J. Amer. Oil Chem. Soc. 37: 165 (1960)]. Other factors affecting protein solubility have been reviewed (S. J. Circle, In "Soybeans and Soybean Products," Ed. K. S. Markley, John Wiley and Sons, New York, 1950; and W. J. Wolf, In "Soybeans: Chemistry and Technology," Ed. A. K. Smith and S. J. Circle, Chapter 4, Avi Publishing Company, Inc., Connecticut, 1972).

Although sonication has been applied in the past to disintegrate and solubilize animal and plant tissue components (I. E. El'Piner, In "Ultrasound: Physical, Chemical and Biological Effects," Chapter VII, Consultants Bureau, New York, 1964; and D. Ensminger, In "Ultrasonics, the Low- and High- Intensity Applications," Marcel Dekker, Inc., New York, 1973), a search of literature indicates that it has not been applied to improve the extraction of proteins in vegetable seed flakes.

In accordance with the invention, I have discovered a method of extracting protein in high yields from vegetable seeds comprising sonicating a vegetable seed composition selected from the group consisting of full-fat vegetable seed flakes, meal, grits, and flour and their defatted analogs and their cooked full-fat and defatted analogs in a suitable solvent. This is accomplished in a solids:solvent ratio of from about 1:10 to 1:40, at a sonic frequency of about 20 KHz and at a sonic output power of from 100 to 500 watts for a time sufficient to solubilize from about 50 to 100 percent of the total protein in the vegetable seed composition. The solids and supernatant solution of proteins are separated using ordinary means, and the protein fraction is then recovered from the solution.

DETAILED DESCRIPTION OF THE INVENTION

Vegetable seeds suitable as starting materials for use in accordance with the invention include soybean, rapeseed, crambe seeds, peanuts, cottonseed, and the like. Corn germ is also a suitable starting material. The seeds must be processed into a usable form for the sonication step. Vegetable seed compositions are defined herein to include full-fat and defatted flakes, meal, grits, and flour. These compositions can be toasted or prepared from a toasted composition. Means for preparing the abovementioned vegetable seed compositions are well known in the art and are beyond the scope of this invention.

Suitable solvents for the sonication are those in which the protein will dissolve or be dispersed sufficiently to pass through a filter. Solvents in this category include water, dilute aqueous alkali (pH 7–9). Other suitable solvents will be known to those skilled in the art and will be within the scope of this invention.

A solids to solvent ratio of from about 1:10 to 1:40 is effective for sonic extraction. The preferred solids:solvent ratio is from about 1:20 to 1:40.

Extraction of protein from vegetable seed composition slurry was accomplished by sonication (i.e., the application of sound waves) at a frequency of 20 KHz at output powers of from about 100 to 500 watts for from about 4 to 10 minutes. The method of the invention illustrated in the examples, infra, was a batch process conducted with a sonifier equipped with a standard mechanical transformer and a step horn, the tip of which was immersed in the slurry. Continuous process can be conducted in several commercially available systems as those used for emulsification, chemical reaction, and extraction. See "Ultrasonics: Methods and Application," J. Blitz, Ed., Chapter 7, VanNostrand, Reinhold Company, New York, 1971 for a more detailed description of the sonication process, applications, and equipment.

Vegetable seed compositions sonicated in accordance with the invention yielded from about 50 to 100 percent of the total protein found in the compositions as opposed to from about 16 to 90 percent yields from the same compositions treated by the conventional stirring method. The greatest differences were found in extractions of toasted compositions. Conventional stirring, single extraction of toasted soy flakes with water yielded only 16 percent of total protein, while sonication yielded 58 percent under the same conditions. Replacing water with a 1N aqueous solution of NaOH, conventional stirring yielded 73 percent of the total protein while sonication yielded 99 percent. In every comparison, sonication resulted in significantly higher yields.

After sonication, the solids are separated from the supernatant solution containing the protein by any conventional method such as filtration, centrifugation, and the like, and protein can be recovered from solution by simply removing the solvent, by precipitating the protein with acid, or by chilling to near 0° C., or by precipitating the protein with metal salts or organic solvents. These and other conventional protein recovery methods will be known to those skilled in the art.

For further details of the method and results see L. C. Wang, J. Food Sci. 40: 549–551 (1975) which is herein incorporated by reference.

The following examples are to further illustrate the invention and are not to be construed as limiting the scope of the invention which is defined by the claims. All percentages and parts herein are by weight unless otherwise specified.

EXAMPLE 1

Whole soybeans from a 1971 crop of Kanrich variety were cracked, dehulled, and flaked. The flakes were defatted by extraction with a hexane-pentane mixture on a laboratory scale. The defatted flakes, which contained 46.4 percent protein based on 7.41 percent total nitrogen (air-dry basis, moisture content 10.7 percent) were stored in a refrigerator at 4° C. before use. A portion of flakes was autoclaved (i.e., toasted) at 120° C. for 20 minutes and stored at room temperature. The respective nitrogen solubility indexes (NSI) were 25 and 91 for autoclaved and unautoclaved flakes (AOCS Methods Ba 11-65, "Official and Tentative Methods," 3rd edition, Amer. Oil Chem. Soc., 1970).

To 5 g. of autoclaved flakes in a 2-oz. glass jar were added 50 ml. distilled water. The jar was chilled in an ice slurry, and the mixture was sonicated for 8 minutes with a Sonifier Model S125 manufactured by Heat Systems-Ultrasonics, Inc., Plainview, N.Y. The sonifier contains a standard mechanical transformer with a step horn and a power unit with a meter measuring input power. The step horn was dipped about 1 inch deep into solution, and the sonication was tuned to a maximum input power at which point the instrument operates at a frequency of 20 KHz and delivers an output power of 125 watts. After sonication, the mixture was centrifuged at 10,000 × X g. for 15 minutes, and the supernatant was poured through a thin layer of glass wool into a cylinder. The volume of the supernatant was recorded, and a portion was taken to measure the amount of proteins by the biuret method [E. Layne, Methods Enzymol. 3: 450 (1957)]. The amount of soluble protein was calculated on the basis of 50 ml. solvent used. Averages of duplicated protein determinations are reported, Table 1.

EXAMPLE 2

In 50 ml. of distilled water, a 5-g. portion of the autoclaved soy flakes described in Example 1 were stirred mechanically at 1,200 r.p.m. (three ½ inch bladed type) at room temperature for 1 hour. The sample was treated the same way as in Example 1 regarding centrifugation, filtration, and measurement of protein, Table 1.

EXAMPLE 3

A soy protein composition was prepared and analyzed as described in Example 1 with the exception that 5 g. of soy flakes were slurried in 50 ml. of aqueous 1N NaOH instead of water, Table 1.

EXAMPLE 4

A soy protein composition was prepared as described in Example 2 with the exception that 5 g. of soy flakes were slurried in 50 ml. of aqueous 1N NaOH instead of water. The composition was analyzed as described in Example 1, Table 1.

EXAMPLE 5

A soy protein composition was prepared and analyzed as described in Example 1 with the exception that the soy flakes were extracted and centrifuged three times and the protein recovered from the combined supernatants, Table 1.

EXAMPLE 6

A soy protein composition was prepared and analyzed as described in Example 2 with the exception that the soy flakes were extracted and centrifuged three times and the protein recovered from the combined supernatants, Table 1.

EXAMPLE 7

A water extract prepared as described in Example 1 was chilled overnight at 4° C. and then centrifuged at 10,000 × X g. at 4° C. to collect the precipitated proteins. The proteins were dissolved in 0.03M phosphate buffer — 0.04M NaCl (pH 7.6, $\mu = 0.5$) and analyzed as in Example 1, Table 1.

EXAMPLE 8

A water extract prepared as described in Example 2 was treated as described in Example 7 (see Table 1 for results).

EXAMPLE 9

A water extract prepared and analyzed as described in Example 1 was titrated with 1N HCl to pH 4.2 and then centrifuged at 34,000 × X g. for 10 minutes to collect the precipitated proteins. The proteins were then treated as described in Example 7 and compared to a protein composition prepared as described in Example 1 and labeled 9A in Table 1 (see Table 1 for results).

EXAMPLE 10

A water extract prepared and analyzed as described in Example 2 was treated as described in Example 9 and compared to a protein composition prepared as described in Example 2 and labeled 10A in Table 1 (see Table 1 for results).

EXAMPLES 11-20

Soy protein compositions were prepared and analyzed as described in Examples 1-10 with the exception that unautoclaved soy flakes were used in place of autoclaved soy flakes. Examples labeled 19A and 20A were prepared as described in Example 1 and 2, respectively, from unautoclaved soy flakes for comparison with above Examples 1-20 (see Table 1 for results).

EXAMPLE 21

Soy protein compositions were prepared and analyzed as described in Example 1 with variable sonic output power and variable solids to solvent ratio at the highest output power. The analysis of these compositions were compared to those of a composition extracted from 1:10 solids to solvent ratio slurry prepared as described in Example 2 (see Table 2 for results).

EXAMPLE 22

Soy protein compositions were prepared and analyzed as described in Example 1 from full-fat soy flakes and at variable sonic output power. Turbidity of the protein solution, caused by the presence of fat, interfered with the analyses. However, the results are sufficiently accurate to show the operability of the method with full-fat flakes, Table 3.

Table 1

| Example | Flakes[1] | Method of extraction[2] | Solvent | Protein extracted, % of total |
|---|---|---|---|---|
| 1 | A | S | Water | 58 |
| 2 | A | CS | Water | 16 |
| 3 | A | S | 1N NaOH | 99 |
| 4 | A | CS | 1N NaOH | 73 |
| 5 | A | S-3X | Water | 69 |
| 6 | A | CS-3X | Water | 32 |
| 7 | A | S-CIF | Water | 8 |
| 8 | A | CS-CIF | Water | 4 |

Table 1-continued

| Example | Flakes[1] | Method of extraction[2] | Solvent | Protein extracted, % of total |
|---|---|---|---|---|
| 9 | A | S-APF | Water | 26 |
| 10 | A | CS-APF | Water | 10 |
| 9A | A | S | Water | 50 |
| 10A | A | CS | Water | 24 |
| 11 | U | S | Water | 88 |
| 12 | U | CS | Water | 60 |
| 13 | U | S | 1N NaOH | 95 |
| 14 | U | CS | 1N NaOH | 91 |
| 15 | U | S-3X | Water | 90 |
| 16 | U | CS-3X | Water | 70 |
| 17 | U | S-CIF | Water | 11 |
| 18 | U | CS-CIF | Water | 7 |
| 19 | U | S-APF | Water | 27 |
| 20 | U | S-APF | Water | 26 |
| 19A | U | S | Water | 56 |
| 20A | U | CS | Water | 37 |

[1] A = autoclaved soy flakes; U = unautoclaved soy flakes.
[2] S = sonic extraction; CS = conventional-stir extraction; 3X = extracted three times; CIF = cold insoluble fraction; APF = acid precipitated fraction.

Table 2

| Method of extraction | Sonic output power, w. | Solids:solvent ratio | Protein extracted, % of total |
|---|---|---|---|
| Conventional-stir | — | 1:10 | 16.8 |
| Sonic | 60 | 1:10 | 18.5 |
| Sonic | 110 | 1:10 | 25.0 |
| Sonic | 125 | 1:10 | 47.8 |
| Sonic | 480 | 1:10 | 47.8 |
| Sonic | 480 | 1:40 | 80.0 |
| Sonic | 480 | 1:60 | 83.5 |

Table 3

| Sonic output power, w. | Solids:solvent ratio | Protein extracted, % of total |
|---|---|---|
| 125 | 1:40 | 81.5 |
| 480 | 1:40 | 67.9 |
| 480 | 1:60 | 61.0 |

EXAMPLE 23

Soy protein compositions were prepared and analyzed as described in Example 1 with varying times of sonication and solids:solvent ratios (see Table 4 for results).

Table 4

| Sonication time, minutes | Solids:solvent ratio | Protein extracted, % of total |
|---|---|---|
| 2 | 1:10 | 38 |
|  | 1:20 | 39 |
|  | 1:40 | 44 |
| 4 | 1:10 | 43 |
|  | 1:20 | 56 |
|  | 1:40 | 58 |
| 6 | 1:10 | 47 |
|  | 1:20 | 60 |
|  | 1:40 | 69 |
| 8 | 1:10 | 47 |
|  | 1:20 | 69 |
|  | 1:40 | 73 |
| 10 | 1:10 | 48 |
|  | 1:20 | 71 |
|  | 1:40 | 82 |

EXAMPLE 24

Soy protein compositions were prepared from autoclaved and unautoclaved soy flakes as described in Example 1 wherein the compositions were analyzed after one, two, and three consecutive sonic extractions. The analytical results were compared to those from compositions prepared from autoclaved and unautoclaved soy flakes as described in Example 2 and analyzed after one, two and three conventional-stir extractions (see Table 5 for results).

Table 5

| No. of consecutive extractions | Protein extracted, % of total | | | |
|---|---|---|---|---|
|  | Autoclaved | | Unautoclaved | |
|  | CS[1] | S[2] | CS[1] | S[2] |
| 1 | 16 | 40 | 20 | 66 |
| 2 | 8 | 15 | 36 | 19 |
| 3 | 7 | 10 | 14 | 5 |

[1,2] See footnotes, Table 1.

I claim:

1. A method of extracting protein from vegetable seeds, comprising the steps of:
   a. sonicating a vegetable seed composition selected from the group consisting of full-fat vegetable seed flakes, meal, grits, and flour and their defatted analogs and their toasted full-fat and defatted analogs in a suitable solvent in a solids:solvent ratio of from about 1:10 to 1:40 at a sonic frequency of about 20 KHz and at a sonic output power of from 100 to 500 watts for a time sufficient to solubilize from about 50 to 100 percent of the total protein in said vegetable seed composition;
   b. separating the solids from the supernatant solution of protein resulting from step (a); and
   c. recovering the protein from the supernatant solution resulting from step (b).

2. A method as described in claim 1 wherein the vegetable seed composition is selected from the group consisting of full-fat soy flakes, meal, grits, and flour and their defatted analogs and their toasted full-fat and defatted analogs.

3. A method as described in claim 1 wherein the suitable solvent is water or a dilute aqueous alkaline solution (pH 7–9).

4. A method as described in claim 1 wherein the suitable solvent is 1N aqueous sodium hydroxide.

5. A method as described in claim 1 wherein the solids:solvent ratio is from 1:20 to 1:40.

6. A method as described in claim 1 wherein the sonic output power is from 125 to 500 watts.

7. A method as described in claim 1 wherein the time of sonication is from about 4 to 10 minutes.

8. A method as described in claim 1 wherein the recovery or protein from the supernatant solution resulting from step (b) is accomplished by the following steps:
   a'. precipitating a portion of the protein contained in said supernatant solution; and
   b'. recovering the precipitated protein resulting from step (a').

9. A method as described in claim 2 wherein the vegetable seed composition is sonicated in water or a dilute aqueous alkaline solution in a solids:solvent ratio of from 1:20 to 1:40 at a sonic frequency of about 20 KHz and at a sonic output power of from 125 to 500 watts for from 4 to 10 minutes.

10. A method as described in claim 8 wherein a portion of the protein contained in the supernatant solutions is precipitated by chilling said supernatant solution at about 4° C. for about 12 to 24 hours, and wherein the precipitated protein is maintained at a temperature of about 4° during the recovery step.

11. A method as described in claim 8 wherein a portion of the protein contained in the supernatant solution is precipitated by decreasing the pH of said supernatant solution to a value of about 4.2.

* * * * *